United States Patent
Müller et al.

(10) Patent No.: US 8,424,833 B2
(45) Date of Patent: Apr. 23, 2013

(54) SUSPENSION DEVICE AND PROCESS FOR MOUNTING SAME

(75) Inventors: Sven Müller, Honigsee (DE); Christian Elsenbach, Ahrensburgh (DE); Carsten Timm, Seth (DE); Hanno Kretschmann, Hamburg (DE)

(73) Assignee: Dräger Medical GmbH, Lübeck (DE)

( * ) Notice: Subject to any disclaimer, the term of this patent is extended or adjusted under 35 U.S.C. 154(b) by 315 days.

(21) Appl. No.: 12/872,216

(22) Filed: Aug. 31, 2010

(65) Prior Publication Data
US 2011/0079697 A1 Apr. 7, 2011

(30) Foreign Application Priority Data

Oct. 1, 2009 (DE) .................... 10 2009 047 971

(51) Int. Cl.
*F16M 11/00* (2006.01)
(52) U.S. Cl.
USPC ........... 248/639; 248/324; 248/343; 362/147; 362/405
(58) Field of Classification Search .................. 248/639, 248/317, 324, 343; 362/33, 35, 147, 405, 362/804
See application file for complete search history.

(56) References Cited

U.S. PATENT DOCUMENTS

| 3,240,925 | A | | 3/1966 | Paschke et al. | |
|---|---|---|---|---|---|
| 6,030,103 | A | * | 2/2000 | Gampe et al. | 362/404 |
| 6,431,515 | B1 | * | 8/2002 | Gampe et al. | 248/324 |
| 6,471,363 | B1 | * | 10/2002 | Howell et al. | 362/11 |
| 6,698,704 | B2 | * | 3/2004 | Kuhn | 248/343 |
| 6,817,585 | B2 | * | 11/2004 | Wagner et al. | 248/324 |
| 6,899,442 | B2 | * | 5/2005 | Howell et al. | 362/147 |
| 7,191,992 | B2 | * | 3/2007 | Wagner et al. | 248/317 |
| 7,726,823 | B2 | * | 6/2010 | Rus et al. | 362/33 |
| 8,070,331 | B2 | * | 12/2011 | Gull et al. | 362/389 |
| 2003/0160142 | A1 | * | 8/2003 | Brahler et al. | 248/317 |
| 2004/0188578 | A1 | | 9/2004 | Turner | |

FOREIGN PATENT DOCUMENTS

| DE | 29508773 | | 11/1996 |
|---|---|---|---|
| DE | 19702222 | | 7/1997 |
| DE | 19945081 | A1 | 3/2001 |
| EP | WO 2009062628 | | 5/2009 |

* cited by examiner

*Primary Examiner* — Bradley Duckworth
(74) *Attorney, Agent, or Firm* — McGlew and Tuttle, P.C.

(57) ABSTRACT

A suspension device (10) with a carrier segment (12) and with at least one extension arm (14) that can be mounted pivotably thereon for moving in space devices (16, 18) that can be mounted thereon. The carrier segment (12) has a base part (24) for mounting the suspension device (10) at a mounting site. The suspension device has one or more quick-release rod modules (26) that can be detachably connected with the base part (24). The quick-release rod module (26) or each quick-release rod module (26) has a bus module (32), which contacts either a bus module (32) of a quick-release rod module (26) already embraced by the suspension device (10) or a contact device in the base part (24) when a quick-release rod module (26) is mounted on the suspension device (10).

12 Claims, 11 Drawing Sheets

SUSPENSION DEVICE AND PROCESS FOR MOUNTING SAME

CROSS REFERENCE TO RELATED APPLICATIONS

This application claims the benefit of priority under 35 U.S.C. §119 of German Patent Application DE 10 2009 047 971.6 filed Oct. 1, 2009, the entire contents of which are incorporated herein by reference.

FIELD OF THE INVENTION

The present invention pertains to a suspension device as it is used, e.g., in an operating room or other treatment rooms, medical or dental offices and the like for moving devices that can be mounted on the suspension device, such as lights, monitors, cameras, etc., in space and hence positioning them as needed, and to a process for mounting same.

BACKGROUND OF THE INVENTION

Suspension devices of this class are known per se and comprise one or more extension arms, which are mounted pivotably on a vertical rod and at the end of which a device is located, for which mobility in different positions and/or different orientations is desired. A suspension device, called a ceiling-supported suspension device, is known from DE 199 45 081 A1, in which flexible cables routed in the individual elements of the suspension are provided for transmitting electric signals and/or electric energy. A slip ring arrangement is mentioned in DE 199 45 081 A1 as a possibility for power transmission between mobile elements of a suspension device.

However, the drawback of prior-art suspension devices is their low flexibility if different configurations are made. Prior-art suspension devices are configured for an exactly specified application. This means, among other things, that the components comprised by the particular suspension device are ordered and finished corresponding to the particular need, i.e., e.g., with one or two extension arms. The central axis is also coordinated in terms of its geometric and static dimensioning with, e.g., the number of extension arms required by the later user.

SUMMARY OF THE INVENTION

One object of the present invention is correspondingly to provide a suspension device which avoids or at least reduces the above-mentioned drawbacks, and especially to provide a suspension device that can be manufactured, mounted and expanded easily, e.g., it can be complemented with another extension arm according to a first configuration with two extension arms.

According to the invention, a suspension device is provided with at least one carrier segment and at least one extension arm that can be mounted thereon for moving devices that can be mounted thereon in space. A base part is provided for mounting the suspension device at a mounting site. One or more quick-release rod modules are detachably connected to the base part. The quick-release rod module or quick-release rod modules has/have a central hole and a bus module therein. The bus module of a quick-release rod module contacts, when mounted on the suspension device, either a bus module of a quick-release rod module already connected as part of the suspension device or a contact device in the base part.

Provisions are made for this in a suspension device with a central axis formed by at least one pivotable carrier segment and with a base part for mounting the suspension device at a mounting site and with at least one extension arm that can be mounted thereon pivotably for one or more quick-release rod modules to be able to be detachably connected to the base part and for the quick-release rod module or for each quick-release rod module to have a central hole and a bus module therein, wherein the bus module of a quick-release rod module contacts either a bus module of a quick-release rod module already connected with the suspension device or a contact device in the base part when mounted at the suspension device.

The central axis of the suspension device comprises, in general, a plurality of partial segments or modules.

The quick-release rod modules that can be mounted directly or indirectly at the base part make it possible to expand the suspension device. The base part and the quick-release rod module or each quick-release rod module form the centrally located axis (central axis) thereof. By taking an additional quick-release rod module, an additional extension arm can be mounted at this quick-release rod module and hence at the suspension device as a whole, without the suspension device having to be removed or disassembled in another way for this. It is especially preferred that the cabling for the electrical signal and energy transmission is also expanded with the mounting of another quick-release rod module. The bus module provided in each quick-release rod module is used for this. In a quick-release rod module to be mounted directly at the base part, the bus module of the quick-release rod module contacts a contact device in the base part. In each quick-release rod module to be mounted at an already mounted quick-release rod module, the bus module of the quick-release rod module contacts the bus module of the respective "last" (or lower) quick-release rod module. Neither the installer of such suspension devices nor the user has to deal with cabling in the interior of the central axis to the extent that was hitherto necessary. Electric signals and electric power for the suspension device, i.e., e.g., for power supply, are led to the contact device in the base part via terminals of the suspension device. From there, they are passed on after contacting by a bus module into the bus module and are available there for tapping, i.e., also for parallel tapping by a plurality of devices, so-called consumers. The energy and data bus formed by the respective bus modules expands with the mounting of every additional quick-release rod module. Electric energy and electrically transmitted data are directly available in each new quick-release rod module by tapping at the bus module or feeding of energy or data is possible. To guarantee fail-safe operation, it is preferably also possible, in particular, to provide at least two redundant energy lines in order to ensure the operation of the connected devices.

The suspension device is suitable for wall or ceiling mounting. Moreover, mounting at another suspension device as well as at extension arms may be considered as well.

Provisions are preferably made for the detachable connection of a quick-release rod module with the base part or of a quick-release rod module already embraced by the suspension device for the base part and each quick-release rod module to have a connection element on a first side, for the connection element of the base part and the connection element of each quick-release rod module to be of identical design, and for each quick-release rod module to have a corresponding matching connection element for mechanically contacting a respective connection element. The connection element at the base part and at each quick-release rod module makes the quick-release rod modules able to be detachably connected to the base part, namely, in such a way that makes possible a modular or building block-like expansion of the suspension device. If the connection element at the base part and at each quick-release rod module has the same design, each quick-release rod module can be combined both with the base part and—with quick-release rod modules already mounted at the base part—with another quick-release rod module. The detachable connection, i.e., the locking of a quick-release rod module at the base part or at another quick-release rod module, is brought about by bringing the connection element and the matching connection element into functional connection with one another, e.g., by screwing with a thread.

Provisions are advantageously made for a plug-in connection system to act as a detachable connection, in which the connection element and the matching connection element are designed as an inner or outer part and outer or inner part, respectively, and wherein the outer and inner parts can be detachably connected to one another with a securing element. Fixation of a plug-in connection system with a securing element is especially simple and efficient and can nevertheless be loaded. The plug-in connection system brings about, moreover, sufficient guiding and adjustment during the process of plugging together, i.e., when the respective inner part is introduced into the corresponding outer part. The adjustment, especially in respect to the subsequent mounting of the securing element, can also be improved by the outer part and inner part having a guide element each in the manner of a web or the like and a corresponding recess. Whether the connection or matching connection element is designed as an outer part may be determined by constructive or even designer considerations.

A preferred embodiment of such a plug-in connection system is characterized in that the connection element is a hollow cylinder with at least one hole extending at right angles and at a spaced location from the central axis and the matching connection element is a hollow cylindrical section with an internal diameter selected depending on the external diameter of the hollow cylinder and with a hole extending corresponding to the hole in the hollow cylinder. The hollow cylinder can then be contacted by plugging in the hollow cylindrical section (plug-in connection). The hollow cylindrical section can then be detachably locked at the hollow cylinder by introducing a locking element acting as a securing element into the holes in the hollow cylindrical section and in the hollow cylinder (detachably locked plug-in connection). Instead of a hole each in the connection element and matching connection element, any desired number of holes may be considered, in principle, to possibly increase the vertical holding force.

According to an alternative embodiment to the plug-in connection, the connection element is a hollow cylinder with a thread and the matching connection element is a union nut with an internal thread adapted to the thread. Such a connection between the base part of the quick-release rod module or a quick-release rod module and another quick-release rod module, which is called a screw connection below, can be manufactured in a simple manner and can be loaded.

According to a preferred embodiment of a screw connection, the quick-release rod module has a flange and the union nut is supported at this flange in case of the detachable connection of a quick-release rod module with the base part or with another quick-release rod module. The flange may be made integrally, especially in one piece, with the body of the quick-release rod module when the body is manufactured, e.g., by the body and the flange made integrally therewith being the result of one and the same manufacturing or shaping process. As an alternative, welding of a ring onto the body is considered as well, so that the ring acts as a flange in the state in which it is connected to the body.

According to an especially preferred embodiment of a screw connection, the union nut is supported at a snap ring that can be mounted at the quick-release rod module when a quick-release rod module is detachably connected to the base part or to another quick-release rod module. The snap ring assumes essentially the same function as a flange, which now becomes dispensable. The advantage of the snap ring as a "removable flange" is that the union nut does not have to be connected to the body already when manufacturing the body or at the latest when welding a ring intended as a flange. In addition, welding operations that may possibly be necessary for mounting a fixed flange become dispensable.

It is common to the screw connection and the plug-in connection that a new plug-in module is brought into connection at first with the base part or a plug-in module already present because of a translatory motion. Locking will then take place by the locking element in case of the plug-in connection and by actuating the union nut in case of the screw connection. The translatory motion permits electrically conductive connection of the bus module.

Provisions are advantageously made concerning the transmission and making available of electric energy and/or electric signals with the bus module for the quick-release rod module or each quick-release rod module to have a slip ring arrangement with an inner ring rotating in unison and with a rotatable outer ring and for the bus module to contact the inner ring. The slip ring arrangement in each quick-release rod module makes possible the rotatable arrangement of devices or assembly units held at least indirectly by the quick-release rod module. The slip ring arrangement even permits any desired number of, for example, 5 million full revolutions, which is impossible in case of a signal or energy transmission line by means of cable connections. Direct contacting of the slip ring arrangement by the bus module makes an additional cabling in the respective quick-release rod module unnecessary and the quick-release rod module also becomes therefore a modular, immediately usable component for a suspension device, which contributes, on the whole, to the possibility of simplified mounting and maintaining of the suspension device.

Provisions are preferably made for the bus module to comprise signal, video and energy lines. The signal lines can then be surrounded, e.g., by energy lines, especially ground wires, so that undesired signal interferences, e.g., crosstalk or the like, are prevented or minimized.

Provisions are advantageously made concerning mechanical design aspects of the suspension device for a basic body to be able to be rotatably combined with the quick-release rod module or with each quick-release rod module, wherein the basic body is designed for the positive-locking contacting of a section of the respective quick-release rod module, which said section is intended therefor, on one side of the quick-release rod module, and has an extension arm mount for an extension arm on an opposite side. Bearings may be mounted on the section of the quick-release rod module intended for contacting by the basic body or bearing surfaces may be provided at the body of the quick-release rod module. The basic body has corresponding sections that can be attached to the bearing or bearings at the quick-release rod module. The basic body is especially preferably open from the quick-release rod module side to the extension arm mount, so that cabling can be led through the basic body and the extension arm up to the spring-loaded arm, device or assembly unit provided at the end thereof. In the basic body the cabling contacts the slip ring arrangement, namely, the outer ring thereof. Provisions are preferably made for this contacting for a plug, with which the strip conductors embraced by the slip ring arrangement can be contacted on the side of the outer ring, to belong to the slip ring arrangement. Connection of the devices or assembly units can then be limited to a connection cable being led from the free end of the extension arm into the basic body and for the connection cable to be then connected to the plug of the slip ring arrangement. A counterplug provided for this especially at the connection cable for an even easier electric connection may be provided at the corresponding device or assembly unit already in the state as shipped, because the internal cross sections of the extension arm and basic body also make it possible to pass through plugs of a certain geometry.

According to a preferred embodiment, a stop can be combined with the basic body for limiting the angle of rotation, so that, e.g. damage to walls and the like or stationary pieces of furniture or damage to devices or assembly units movably held with the suspension device is prevented when the suspension device is mounted in the area of such walls and the like or stationary pieces of furniture. At least one hole is provided for passing through additional optional cables that are to be passed through.

If an extension arm has a spring-loaded arm holder at its end facing away from the basic body, provisions are advantageously made for mounting the rotary plug outer ring, which can be contacted by the rotary plug inner part in the mounted position, in the spring-loaded arm holder as a stationary part of a rotary plug with a rotary plug outer ring and a rotary plug inner part. The electric cabling can then be led in the sense of a modular design of the suspension device and to facilitate the maintenance and mounting of the suspension device from the bus in the central axis, via the slip ring arrangement and through the basic body and the extension arm to the rotary plug. The corresponding device is then connected by introducing the rotary plug inner part, which closes, e.g., the connection cable of the corresponding device. Extensive modularity is achieved by means of adapters for different spring-loaded arm sizes.

Concerning the use of the suspension device as is here and hereinafter described, another aspect of the present invention is a process for mounting the suspension device, wherein a quick-release rod module is combined with a mounted base part or with a quick-release rod module already located at the base part and both a mechanical and electric connection are established with the base part and with the quick-release rod module present. The mechanical connection now established is, e.g., the plug-in or screw connection already described. The electric connection is, e.g., the modular continuation of conductor elements (bus module), which make it possible to tap or feed electric energy and/or electric signals during the operation in the manner of a bus system.

An exemplary embodiment of the present invention will be explained in more detail below on the basis of the drawings. Objects or elements corresponding to each other are designated by the same reference numbers in all figures. The exemplary embodiment or each exemplary embodiment is not to be construed to be a limitation. Numerous variations and modifications are rather possible within the framework of the present disclosure, especially such variants and combinations that can be identified by the person skilled in the art in respect to accomplishing the object, for example, by a combination or modification of individual features or elements or process steps described in general or in the special description part and contained in the claims and/or in the drawings and lead through combinable features to a new object or to new process steps or process step sequences. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
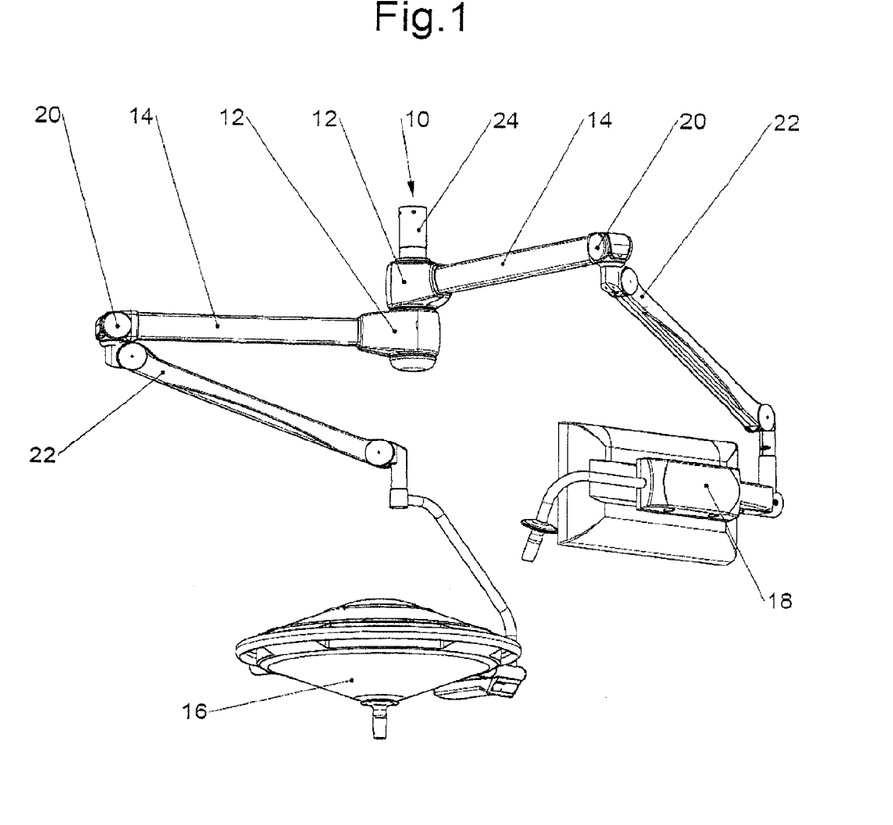
FIG. 1 is a perspective view of a quick-release rod module equipped with exemplary devices according to the invention.

Referring to the drawings in particular, FIG. 1 shows an exemplary configuration of a suspension device according to the present invention, designated as a whole by 10. The suspension device 10 comprises at least one base part 24 and a fully functional, pivotable carrier segment 12 as well as an extension arm 14 mounted thereon. Base part 24 is used to mount the entire suspension device 10 at a mounting site, for example, on the ceiling or wall of an operating room or at the extension arm 14 of another suspension device 10. Each extension arm 14 is intended for moving in space devices or assembly units mounted thereon indirectly or directly, here, for example, a lamp 16 and a monitor 18. Each extension arm 14 ends in the configuration being shown in a spring-loaded arm holder 20 and a spring-loaded arm 22 joining same. An additional degree of rotatory freedom is obtained with the spring-loaded arms 22. Furthermore, it is also possible to change the vertical position of the respective devices mounted.

Figure 2:
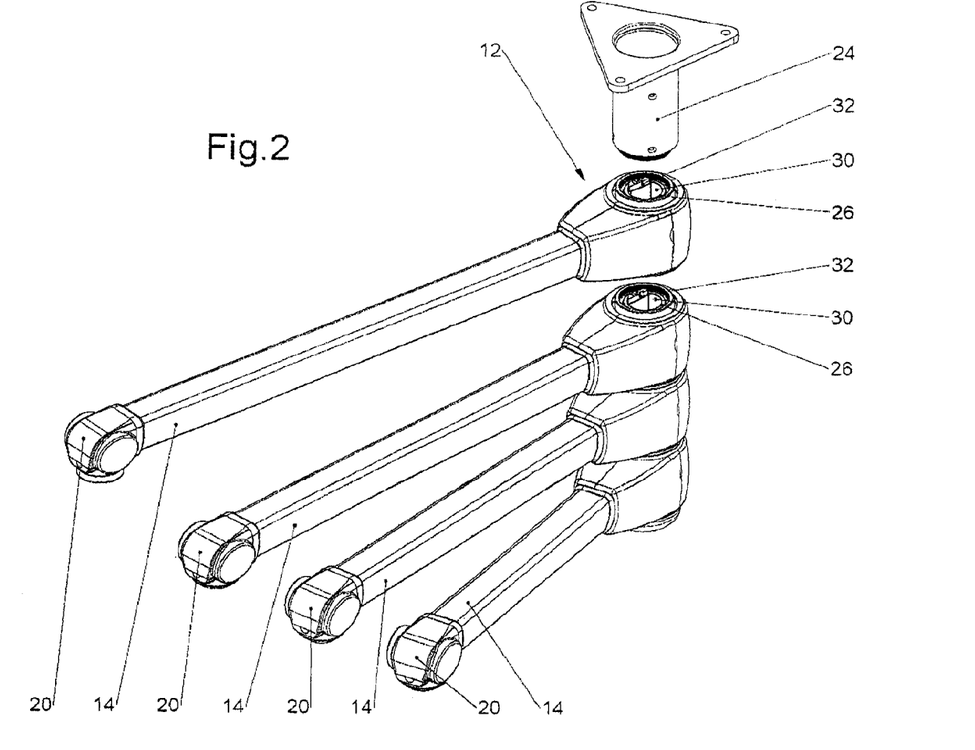
FIG. 2 is a perspective view showing the modular design of a suspension device according to the invention.

Further details of the central axis are explained on the basis of FIG. 2.

FIG. 2 shows the modular design of the suspension device 10 according to the present invention. The basic design comprises the pivotable carrier segment 12 and base part 24, which is provided for mounting the suspension device 10 at the respective mounting site. The suspension device 10 may comprise, as is shown, a plurality of carrier segments 12, which can be detachably connected to the base part 24 by means of the quick-release rod modules 26 (shown in the interior of a cover in FIG. 2). The detachable connection of a quick-release rod module 26 with the base part 24 means here either the detachable connection, which exists directly between the base part 24 and a quick-release rod module 26, or the detachable connection between a quick-release rod module 26 and another quick-release rod module 26, which is in turn indirectly or directly connected to base part 24. A hitherto unavailable possibility of expansion is obtained due to the modular design of the suspension device 10. The suspension device 10 can be complemented by a pivotable carrier segment 12 and hence by another extension arm 14 by adding a quick-release rod module 26.

Figure 3:
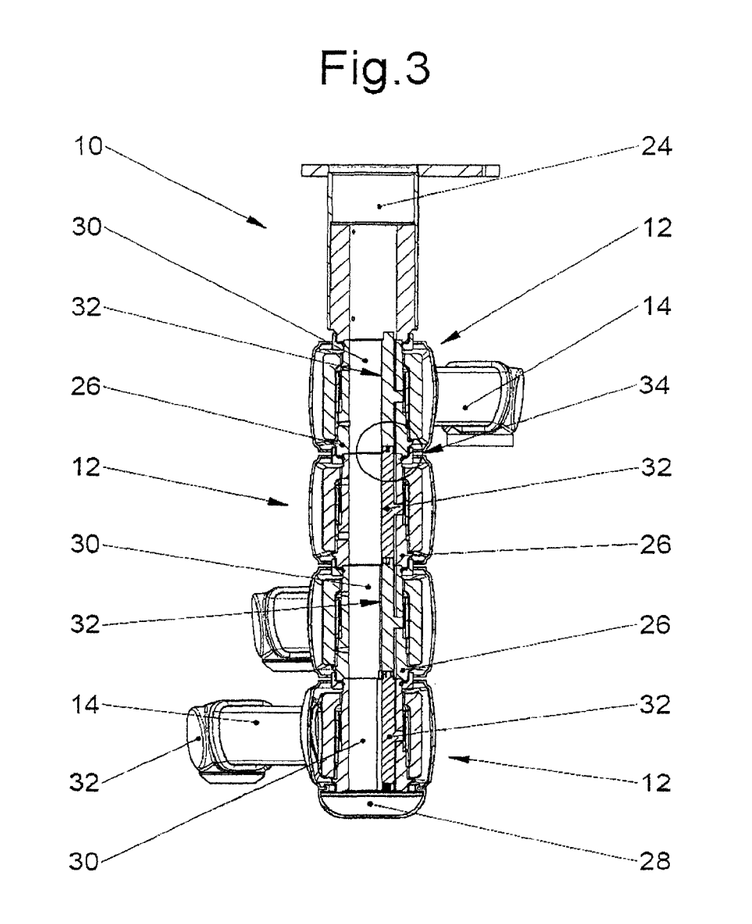
FIG. 3 is a side sectional view showing the modular design of a suspension device according to the invention with quick-release rod modules provided therefor.

FIG. 3 shows the conditions shown in a perspective side view in FIG. 2 in a sectional view in the pivot axis of the extension arms 14. Furthermore, FIG. 3 shows the individual quick-release rod modules 26, which are still shown at spaced locations from one another in FIG. 2 in the manner of a partially exploded view, in the state in which they are combined with one another. It can also be recognized from FIG. 3 that suspension device 10 is closed by an end piece 28 after the last quick-release rod module 26.

It can, furthermore, be recognized in FIG. 3 but even in FIG. 2 already that each quick-release rod module 26 has an axial opening, which will hereinafter also be called a central hole 30, and a bus module 32 therein. The contact area between two adjacent quick-release rod modules 26, which is marked by a circle 34, will be explained below with reference to the other FIGS. 4, 5 and 6.

Figure 4:
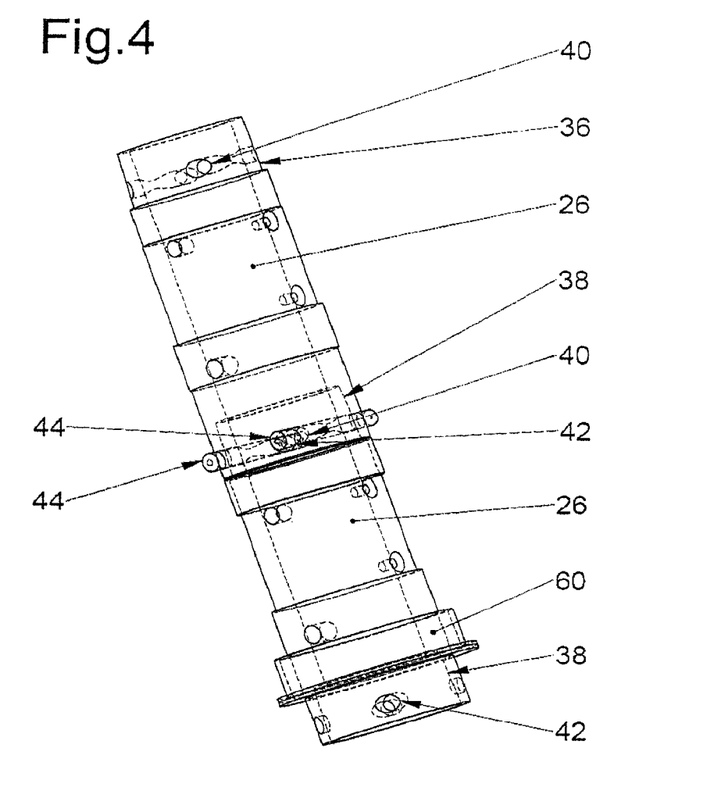
FIG. 4 is a side view showing two quick-release rod modules combined by a plug-in connection.

FIG. 4 shows two quick-release rod modules 26 combined with one another. Each quick-release rod module 26 (but also base part 24; not shown in FIG. 4, see FIG. 3) has at one end a connection element 36. At an opposite end, each quick-release rod module 26 has a corresponding matching connection element 38. Connection element 36 is a hollow cylinder or possibly also a hollow cylinder with a conical outer jacket surface with at least one hole 40 extending at right angles to the central axis of the quick-release rod module 26 in the plug-in connection shown in FIG. 4 and provided for the detachable connection of adjacent quick-release rod modules 26. The matching connection element 38 is correspondingly a hollow cylindrical section formed at the opposite end of the quick-release rod module 26 with an internal diameter adapted to the external diameter and possibly to a conical or other contour of the connection element 36 (hollow cylinder). Connection element 36 can thus be contacted with the corresponding matching connection element 38 in a positive-locking manner. Matching connection element 38 has a hole 42 extending correspondingly to hole 40 in connection element 36, and a quick-release rod module 26 can be detachably locked either at part 24 (FIG. 3) or at another quick-release rod module 26 already mounted indirectly or directly at base part 24 by introducing a locking element 44, e.g., in the form of the locking pin shown.

Figure 5:
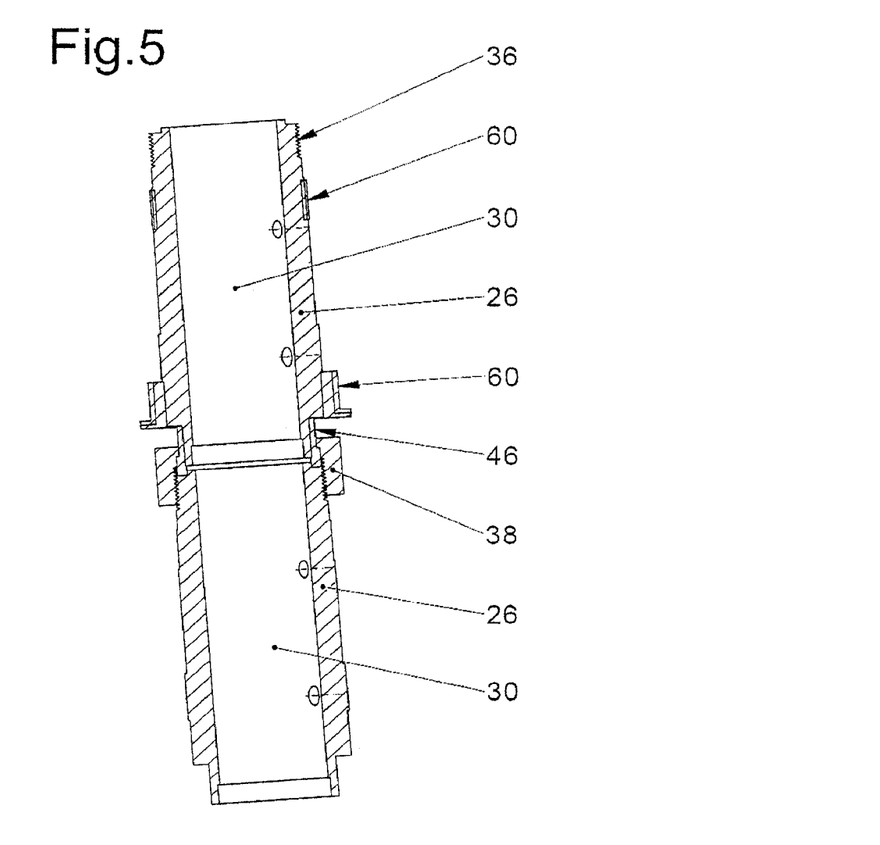
FIG. 5 is a sectional view showing two quick-release rod modules combined by a screw connection.
Figure 6:
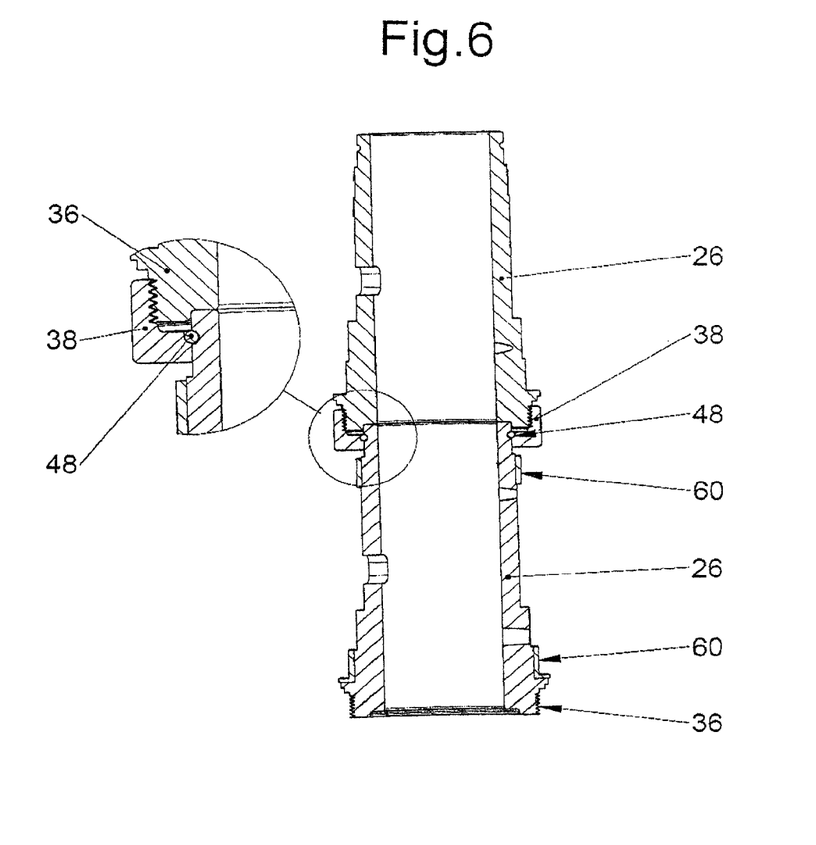
FIG. 6 is a view showing two quick-release rod modules combined by a special embodiment of a screw connection.

As an alternative to the plug-in connection shown in FIG. 4, a screw connection may also be considered between base part 24 and quick-release rod module 26 or two adjacent quick-release rod modules 26, and further details of this are shown in FIGS. 5 and 6.

FIG. 5 shows two quick-release rod modules 26 combined with one another by a screw connection in a longitudinal section. It can be recognized especially clearly in this longitudinal section that each quick-release rod module 26 has a central hole 30, in which supply lines for supplying the devices or assembly units 16, 18 (FIG. 1) mounted at the suspension device 10 can be routed. To connect the two adjacent quick-release rod modules 26 shown, a connection element 36 in the form of a hollow cylinder with an external thread is shown on one side of each quick-release rod module 26 and a union nut is shown as a matching connection element 38 on an opposite side. The union nut has, of course, an internal thread adapted to the external thread of the connection element 36 for connecting two adjacent quick-release rod modules 26. The union nut is supported at a flange 46 at the matching connection element-side end of the quick-release rod module 26. Flange 46 may be permanently connected to the body of the quick-release rod module 26, e.g., by welding. An alternative to the screw connection according to FIG. 5 is shown in FIG. 6.

FIG. 6 shows, just as FIG. 5, two adjacent quick-release rod modules 26 combined by a screw connection in a longitudinal section. Connection element 36 and matching connection element 38 are, just as in FIG. 5, an external thread and a union nut. Contrary to the screw connection according to FIG. 5, a snap ring 48 that can be mounted at the quick-release rod module 26 is shown instead of flange 46 (FIG. 5) in the embodiment in FIG. 6. For example, a round wire snap ring may be considered as a snap ring 48. A contour on the surface of quick-release rod module 26 and in the union nut ensure a positive-locking and loadable connection in the connection of the components involved, namely, the surface of quick-release rod module 26 with mounting contour for the snap ring 48, the snap ring 48 itself, the union nut as a matching connection element 38 and the external thread of the adjacent quick-release rod module 26 as a connection element 36. Snap ring 48 has, moreover, the advantage that the integral formation of a flange 46 (FIG. 5) on the quick-release rod module 26 is eliminated and with the snap ring 48, the union nut as a matching connection element 38 must be combined with the corresponding quick-release rod module 26 basically only at the time of mounting the corresponding quick-release rod module 26.

It applies to all the possibilities of connection shown in FIGS. 4, 5 and 6 that the connection element 36 of each quick-release rod module 26 and a corresponding connection element 36 (not shown separately) of base part 24 are of identical design. Each quick-release rod module 26 can be combined per matching connection element 38 with the base part 24. Even quick-release rod modules 26 mounted indirectly or directly at the base part 24 can be expanded by another quick-release rod module 26.

Figure 7:
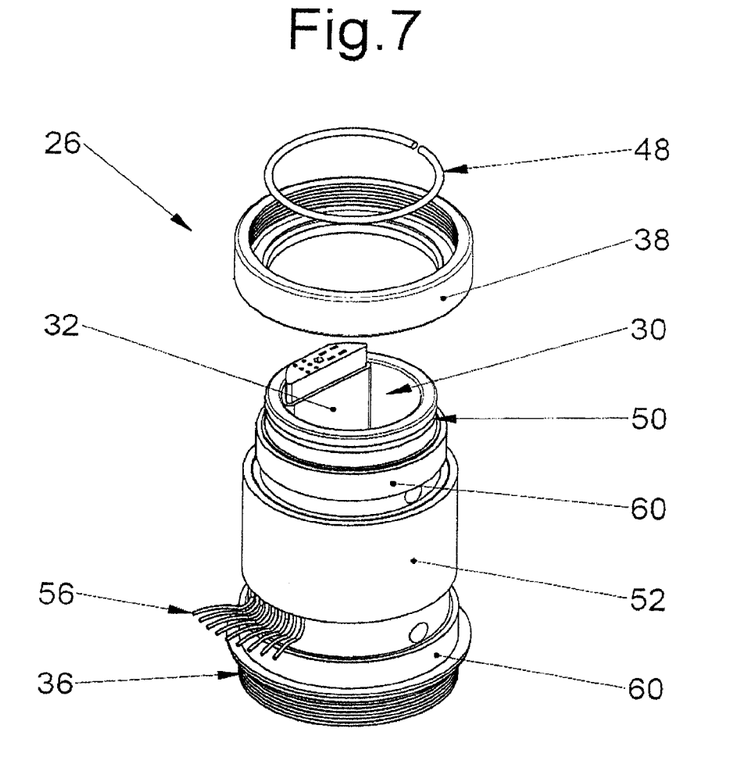
FIG. 7 is a perspective view of a quick-release rod module with a bus module mounted therein.
Figure 8:
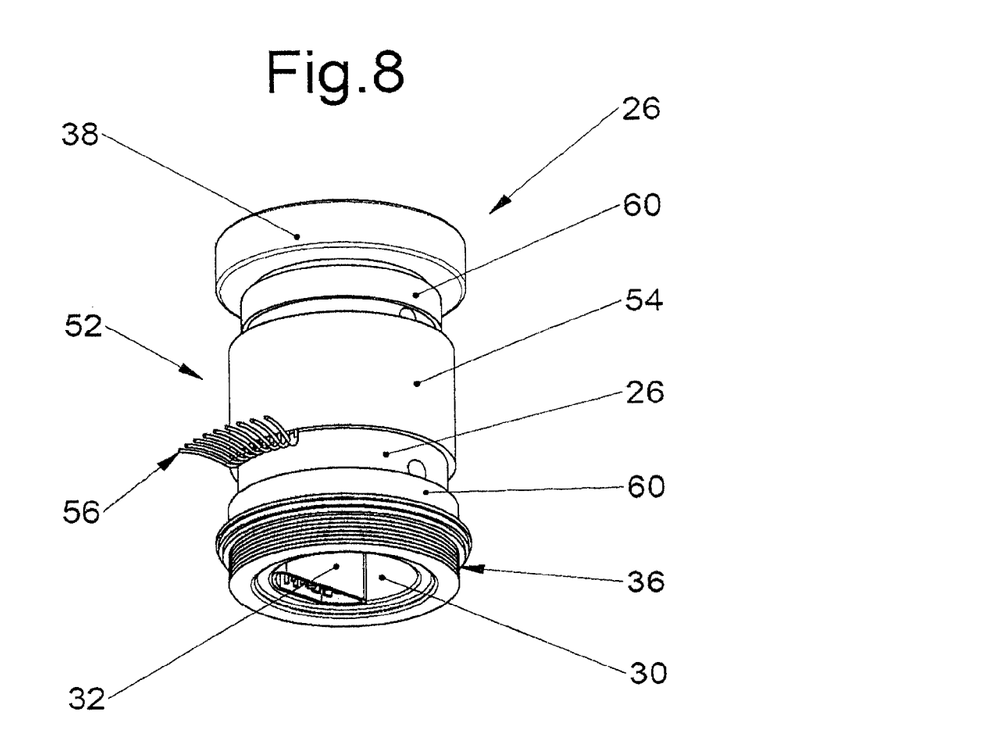
FIG. 8 is a perspective view of a quick-release rod module with a bus module mounted therein.

FIGS. 7 and 8 show details of electric conductors routed in the quick-release rod module 26. FIG. 7 shows a perspective view of a quick-release rod module 26 from a position above the matching connection element-side end. FIG. 8 shows a corresponding view of a quick-release rod module 26 from a position below the connection element-side end. The external thread and a union nut are again shown as connection and matching connection elements 36, 38 in FIGS. 7 and 8 (cf. FIGS. 5 and 6). In addition, snap ring 48 (cf. embodiment according to FIG. 7) and the ring-shaped recess 50 provided for receiving the snap ring 48 in the jacket surface of quick-release rod module 26 can be recognized especially clearly in FIG. 7.

The bus module 32 mounted in the central hole 30 of quick-release rod module 26 can be recognized in FIG. 7 and in FIG. 8. Furthermore, quick-release rod module 26 is combined with a slip ring arrangement 52 with an inner ring rotating in unison and with a rotatable outer ring 54. The slip ring arrangement 52 is a component that is known per se, and bus module 32 contacts the inner ring of the slip ring arrangement 52, so that electric potentials or electric signals carried via the conductors of the bus module 32 can be tapped at terminals 56 of the slip ring arrangement 52. The transmission of electric energy and/or electric signals from the bus module 32 or the feeding thereof into the bus module 32 via the slip ring arrangement 52 makes possible a rotatable mobility of the extension arms 14 (FIG. 1) up to multiple full revolutions.

Figure 9:
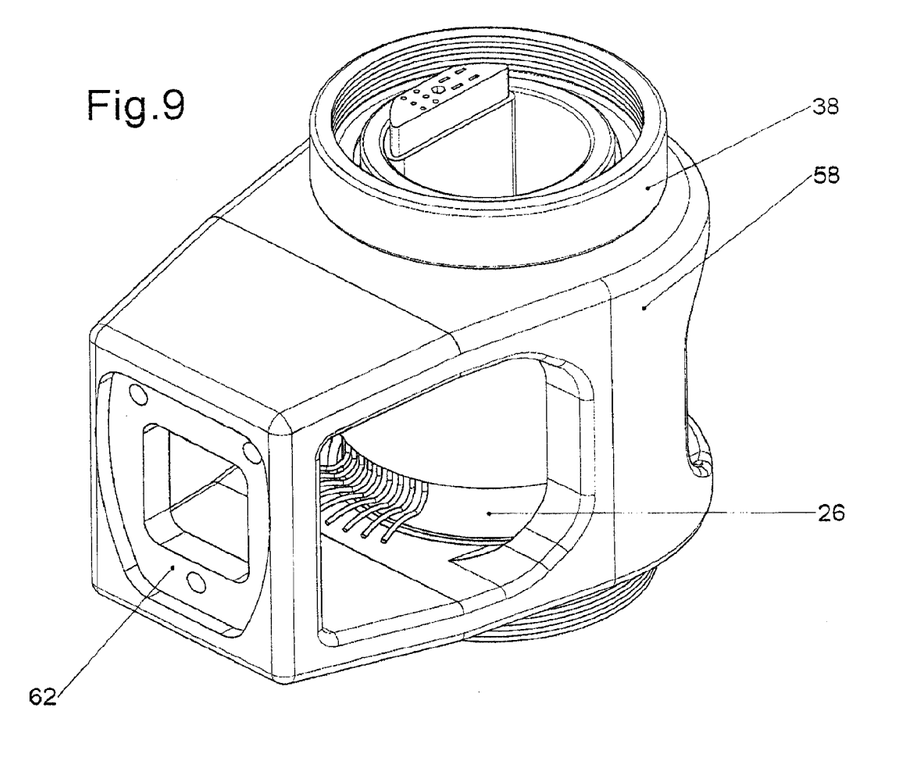
FIG. 9 is a perspective view showing a quick-release rod module with a basic body intended for receiving an extension arm.

FIG. 9 shows a quick-release rod module 26, of which essentially the matching connection element 38 is visible in the view, in a configuration in which it can be combined with a basic body 58 for mounting an extension arm 14 (FIG. 1). Basic body 58 contacts one or more bearing surfaces 60 (cf. FIGS. 4-8) provided at the quick-release rod module 26 and has corresponding matching bearing surfaces not visible in the view in FIG. 9 for positive-locking contact with the bearing surfaces 60. Basic body 58 is consequently formed on a quick-release rod module side for contacting in a positive-locking manner one or more sections intended for this, i.e., e.g., the bearing surfaces 60, of the respective quick-release rod module 26. On a side located opposite the quick-release rod module side, basic body 58 has an extension arm mount 62 for mounting an extension arm 14 (FIG. 1). Basic body 58 has, on the whole, a cage-like design, so that it is open from the quick-release rod module side up to the extension arm mount 62, which facilitates contacting of the terminals 56 or the placing of other electric lines in the area of basic body 58. Basic body 58 may be provided with a cover (not shown), which also acts at the same time as a cover of the pivotable carrier segment 12, above all if basic body 58 encloses, as is shown, the respective quick-release rod module 26 over a large area.

Figure 10:
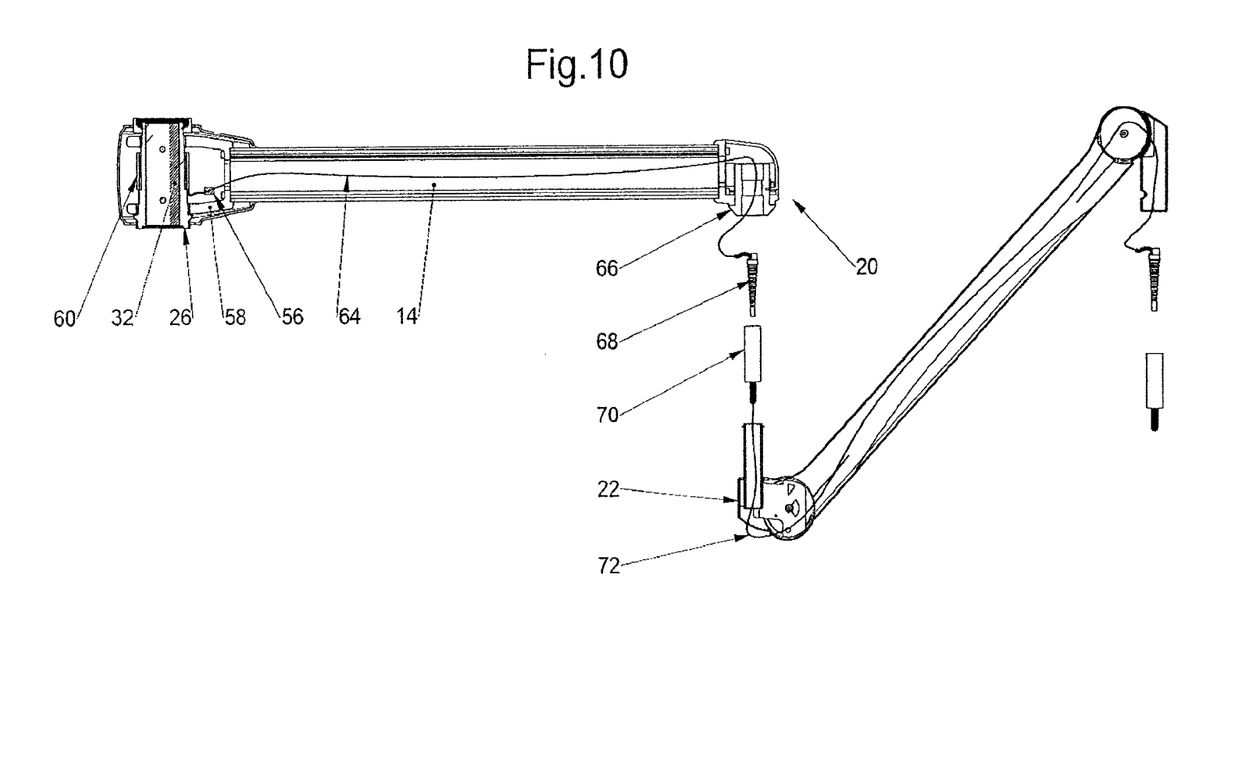
FIG. 10 is a sectional view showing electric lines and line elements of an individual extension arm at a quick-release rod module.

FIG. 10 shows now, with reference back to the view especially in FIG. 7, FIG. 8 and FIG. 9, a schematically simplified view of an individual extension arm 14 at a quick-release rod module 26 with the basic body 58 mounted thereon. Quick-release rod module 26 comprises the bus module 32, and slip ring arrangement 52 is contacted by means of bus module 32. Terminals 56 can be contacted with a corresponding counter-plug in the area of basic body 58, e.g., in case of a plug mounted thereon, and transmission of the potentials and signals that can be tapped at bus module 32 via slip ring arrangement 52 into extension arm 14 can be brought about with an electric line 64 led there. A spring-loaded arm holder 20, which is shown in a schematically simplified manner in the view in FIG. 10 with further details, namely, an adapter 66 for mounting the spring-loaded arm holder 20 and a rotary plug with rotary plug outer ring 68 and rotary plug inner part 70, may be provided at the end of extension arm 14. The use of a rotary plug makes possible the pivotability intended for the spring-loaded arm 22. Due to the combination of the two parts of the rotary plug, the potentials and signals that can be tapped at bus module 32 become available up to an electric line 72 led in the spring-loaded arm 22, where the potentials and signals can be tapped at the end of the spring-loaded arm 22 for connecting a device or assembly unit that can be mounted there, e.g., in the manner of the monitor 18 shown in FIG. 1.

Figure 11:
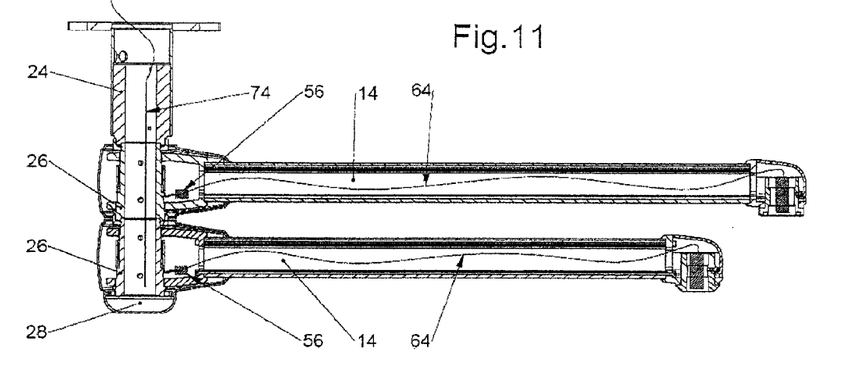
FIG. 11 is a sectional view showing electric lines and line elements between two quick-release rod modules and beginning from same.
Figure 12:
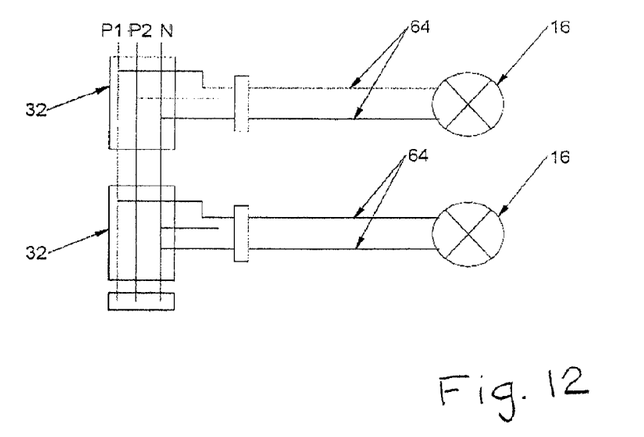
FIG. 12 is a schematic view showing bus modules electric lines and powered device.

Finally, FIG. 11 shows in a schematically simplified view the electric contacts that are obtained when mounting a suspension device 10 according to the present invention. Electric energy and electric signals are made available in the manner of a bus 74 in the central axis formed by base part 24 and one or more quick-release rod modules 26. The design embodiment of bus 74 with the strip conductors embraced thereby is the bus module 32, which is provided in each quick-release rod module 26 and is shown in the lower part of the view in FIG. 11. Bus 74 is contacted in each quick-release rod module 26 by the slip ring arrangement 52 (FIG. 7, FIG. 8), so that all the potentials or signals carried via bus 74 are also available at the terminals 56 of the slip ring arrangement 52. Transmission into an extension arm 14 that can be mounted at each quick-release rod module 26 takes place from there by means of an electric line 64 each led therein, and reference is therefore made to the further description of FIG. 10. Individual strip conductors, as they may be embraced by bus module 32, are shown as examples in the lower part of the view in FIG. 11. Accordingly, bus module 32 shown comprises three strip conductors, namely, a first strip conductor and a second strip conductor for power supply P1, P2, comprises, for example, three individual lines each, and a third strip conductor for the signal transmission, for example, for the transmission of data/control signals in a network N, comprises, for example, six individual lines. All three strip conductors are contacted by the slip ring arrangement 52 and the corresponding potentials are thus available at terminals 56 thereof. Provisions are made in the situation shown in FIG. 12 for tapping the power supply P1 and the signal strip conductor N for an upper quick-release rod module 26 with a device, e.g., lamp 16 (FIG. 1) mounted thereon. The connection for a device mounted at the quick-release rod module 26 located thereunder, i.e., e.g., monitor 18 shown in FIG. 1, has an analogous design, and the second strip conductor P2 may be used for redundancy and fail-safe operation. The view in FIG. 12 is greatly simplified, and, e.g., the transmission of electric signals made available via bus modules 32 is not shown, the term transmission covering both the transmission of electric signals to the respective devices 16, 18 and transmission from these devices 16, 18. Likewise not shown is a constellation in which a plurality of devices 16, 18 use the energy supply in the manner of a parallel tapping. Further configurations and combinations thereof are conceivable.

Thus, the present invention can be briefly described as follows: A suspension device 10 with a pivotable carrier segment 12 and at least one extension arm 14 that can be mounted pivotably thereon for moving in space devices 16, 18 that can be mounted thereon, wherein the pivotable carrier segment 12 has a base part 24 for mounting suspension device 10 at a mounting site, in which one or more quick-release rod modules 26 can be detachably connected to base part 24 and in which the quick-release rod module 26 or each quick-release rod module 26 has a bus module 32, which contacts either a bus module 32 of a quick-release rod module 26 already embraced by suspension device 10 or a contact device in base part 24 when a quick-release rod module 26 is mounted on suspension device 10. The advantage of the suspension device 10 according to the present invention is the modular design thereof, both in terms of the possibility of the mechanical combination of the quick-release rod modules 26 and in terms of the electric contacting thereof with one another via bus modules 32. The modular components, i.e., especially the quick-release rod modules 26, may also be provided at the end of extension arms of existing suspension devices or suspension devices 10 according to the present invention in order to install an additional degree of rotatory freedom there.

While specific embodiments of the invention have been described in detail to illustrate the application of the principles of the invention, it will be understood that the invention may be embodied otherwise without departing from such principles.

APPENDIX

List of Reference Numerals

10 Suspension device   50 Ring-shaped recess
12 Pivotable carrier segment   52 Slip ring arrangement 14 Extension arm
16 Lamp
18 Monitor
20 Spring-loaded arm holder
22 Spring-loaded arm
24 Base part
26 Quick-release rod module
28 End piece
30 Central hole
32 Bus module
34 Circle
36 Connection element
38 Matching connection element
40 Hole
42 Hole
44 Locking element
46 Flange
48 Snap ring
54 Rotatable outer ring
56 Terminals
58 Basic body
60 Bearing surfaces
62 Extension arm mount
64 Electric line
66 Adapter
68 Rotary plug outer ring
70 Rotary plug inner part
72 Electric line
74 Bus (energy, data)

What is claimed is:

1. A suspension device comprising:
a carrier segment;
an extension arm mounted on the carrier segment for moving devices that can be mounted on the extension arm;
a base part for mounting the suspension device at a mounting site;
a contact device in the base part;
a quick-release rod module detachably connected to the base part, the quick-release rod module forming part of the carrier segment, the quick-release rod module having a central hole and a bus module therein;
another quick-release rod module detachably connected to one of the base part and the quick-release rod module, wherein said bus module engages, when mounted on the suspension device, either said another bus module of another quick-release rod module or the contact device in the base part;
a connection element provided as part of each of the quick-release rod modules and the base part, the connection element being on a first side for detachably connecting the quick-release rod module or the another quick-release rod module with the base part or with the quick-release rod module or the another quick-release rod module;
a connection element of the base part and connection element of the quick-release rod module or of the another quick-release rod module having an identical design, wherein each quick-release rod module has a corresponding matching connection element for mechanically contacting with a corresponding connection element, said connection element being a hollow cylinder with a thread, said matching connection element being a union nut with an internal thread adapted to the thread.

2. A suspension device in accordance with claim 1, wherein the union nut is supported at a flange embraced by the quick-release rod module in case of the detachable connection of a quick-release rod module at the base part or at another quick-release rod module.

3. A suspension device in accordance with claim 1, wherein the union nut is supported at a snap ring that is mounted at the quick-release rod module, in case of a detachable connection of a quick-release rod module, at the base part or at another quick-release rod module.

4. A suspension device in accordance with claim 1, wherein each quick-release rod module has a slip ring arrangement with an inner ring rotating in unison and with a rotatable outer ring and wherein said bus module contacts the inner ring.

5. A suspension device in accordance with claim 4, wherein said bus module comprises signal and energy lines including two energy lines and at least one signal or data line.

6. A suspension device in accordance with claim 1, further comprising:
a basic body rotatably contacted with the quick-release rod module or with the quick-release rod module and the another quick-release rod module, wherein:
the basic body includes one side of a quick-release rod module for the positive-locking contacting of a section of the respective quick-release rod module, which said section is intended therefor, and has an extension arm mount for an extension arm on an opposite side.

7. A suspension device in accordance with claim 6, wherein the basic body is open from the quick-release rod module side to the extension arm mount.

8. A suspension device in accordance with claim 6, wherein the basic body is combined with a stop for limiting an angle of rotation.

9. A suspension device in accordance with claim 6, wherein the extension arm has a spring-loaded arm holder at an end facing away from the basic body and a rotary plug outer ring, which can be contacted by a rotary plug inner part in the mounted position, the rotary plug outer ring being mounted in the spring-loaded arm holder as a stationary part of a rotary plug with the rotary plug outer ring and the rotary plug inner part.

10. A process for mounting a suspension device, the process comprises the steps of:
providing a carrier segment;
providing an extension arm mounted on the carrier segment for moving devices that can be mounted on the extension arm;
providing a base part for mounting the suspension device at a mounting site, said base part comprising a base part connection element on one side thereof;
providing a contact device in the base part;
providing a quick-release rod module, the quick-release rod module forming part of the carrier segment, the quick-release rod module having a central hole and a bus module therein, said quick-release rod module comprising a quick-release rod module connection element on one side thereof and a quick-release rod module matching connection element on another side thereof, said quick release-rod module connection element being identical to said base part connection element, said base part connection element and said quick-release rod module connection element comprising a hollow cylinder with an external threaded portion, said quick-release rod module matching connection element comprising an union nut comprising an internal union nut thread for mechanically contacting said external threaded portion of said base part or another quick-release rod module already located at the base part;
combining the quick-release rod module with said mounted base part or with the another quick-release rod module already located at the base part; and
establishing both mechanical and electric connection with the base part or with the quick-release rod module, wherein said bus module contacts, when mounted on the suspension device, either another bus module of the another quick-release rod module or the contact device in the base part.

11. A process in accordance with claim 10, further comprising:
providing another quick-release rod module detachably connected to one of the base part and the quick-release rod module, said another quick-release rod module comprising another quick-release rod module connection element on one side thereof and another quick-release rod module matching connection element on another side thereof, said another quick-release rod connection element being identical to said base part connection element and said quick-release rod module connection element, said another quick-release rod module connection element comprising another hollow cylinder with another external threaded portion, said another quick-release rod module matching connection element comprising another union nut comprising another internal union nut thread, said another internal union thread engaging one of said base part connection element and said quick-release rod module connection element.

12. A suspension device comprising:
a base part for mounting the suspension device at a mounting site;
a contact device in the base part;
a carrier segment with an extension arm mounted on the carrier segment for moving devices that can be mounted on the extension arm;
a quick-release rod module detachably connected to the base part, the quick-release rod module forming part of the carrier segment, the quick-release rod module having a central hole and a bus module therein;
another carrier segment with another extension arm mounted on the another carrier segment for moving devices that can be mounted on the another extension arm;
another quick-release rod module detachably connected to the quick-release rod module, the another quick-release rod module forming part of the another carrier segment, the another quick-release rod module having a central hole and another bus module therein, wherein the bus module contacts, when mounted on the suspension device, the another bus module of the another quick-release rod module and the contact device in the base part;
a connection element as part of each of the quick-release rod modules and the base part, the connection element being on a first side for detachably connecting the quick-release rod module or the another quick-release rod module with the base part or with the quick-release rod module or the another quick-release rod module, wherein a connection element of the base part and the connection element of the quick-release rod module or of the another quick-release rod module have an identical design, each quick-release rod module having a corresponding matching connection element for mechanically contacting with a corresponding connection element, each connection element comprising a hollow cylinder with a thread, each matching connection element comprising a union nut with an internal thread adapted to the thread.

* * * * *